United States Patent [19]

Duensing

[11] Patent Number: 5,411,382

[45] Date of Patent: May 2, 1995

[54] OIL PUMP, MORE PARTICULARLY FOR A CHAIN SAW

[75] Inventor: Hermann Duensing, Hamburg, Germany

[73] Assignee: Domar GmbH, Hamburg, Germany

[21] Appl. No.: 26,378

[22] Filed: Mar. 4, 1993

[30] Foreign Application Priority Data

Mar. 13, 1992 [DE] Germany .............. 9203378 U

[51] Int. Cl.⁶ .............................................. F04B 7/06
[52] U.S. Cl. .................................................... 417/500
[58] Field of Search ................... 417/499, 500; 184/33

[56] References Cited

U.S. PATENT DOCUMENTS

| | | | |
|---|---|---|---|
| 3,285,192 | 11/1966 | Gutkowski | 417/500 |
| 3,938,622 | 2/1976 | Densow | 184/15 |
| 4,034,830 | 7/1977 | Makai et al. | 184/33 X |
| 4,043,711 | 8/1977 | Seino | 417/500 X |
| 4,231,716 | 11/1980 | Kubota | 417/500 X |
| 4,465,440 | 8/1984 | Thomsen et al. | 417/500 |
| 4,797,073 | 1/1989 | Kubota | 417/461 |
| 4,801,253 | 1/1989 | Johansson | 184/33 X |
| 5,236,314 | 8/1993 | Nagashima | 184/33 X |

FOREIGN PATENT DOCUMENTS 0042900 1/1982 European Pat. Off. ........ F23K 5/00

Primary Examiner—Timothy S. Thorpe
Attorney, Agent, or Firm—Townsend and Townsend Khourie and Crew

[57] ABSTRACT

The claimed invention is an oil pump (18), more particularly for a chain saw (100). The oil pump has a cylindrical pump chamber (20) constructed in a pump housing (19). The pump housing has an intake slot (21) and an outlet slot (23). A pump piston (25) is slidably and rotatably mounted in the pump chamber (20), and is rotatable by means of a gearing (30). The pump piston has a sloping terminal surface (35) that wobbles when the pump piston (25) rotates. The surface area (35) is springably supported against a stop (36). The stop (36), which is located on a rotating element (40), is disposed in the direction of a central longitudinal axis (L) of the pump piston (25) at a fixed distance (R) from the central longitudinal axis (L). The distance (R) predetermines the pump stroke. The angular position of the stop (36) is adjustable by rotating the rotating element (40) about its axis of rotation, thereby causing a phase shift in which the degree of overlap in the opening of the inlet slot and outlet slot change. This makes possible an accurately defined adjustment in pump flow volume, so that the minimum and maximum oil flow rate can be readily defined. This regulating means is simple in its construction, uses but a few component parts, and can be simply altered with regard to the oil volume to be delivered so as to adapt the oil pump to different chain saw types.

8 Claims, 2 Drawing Sheets

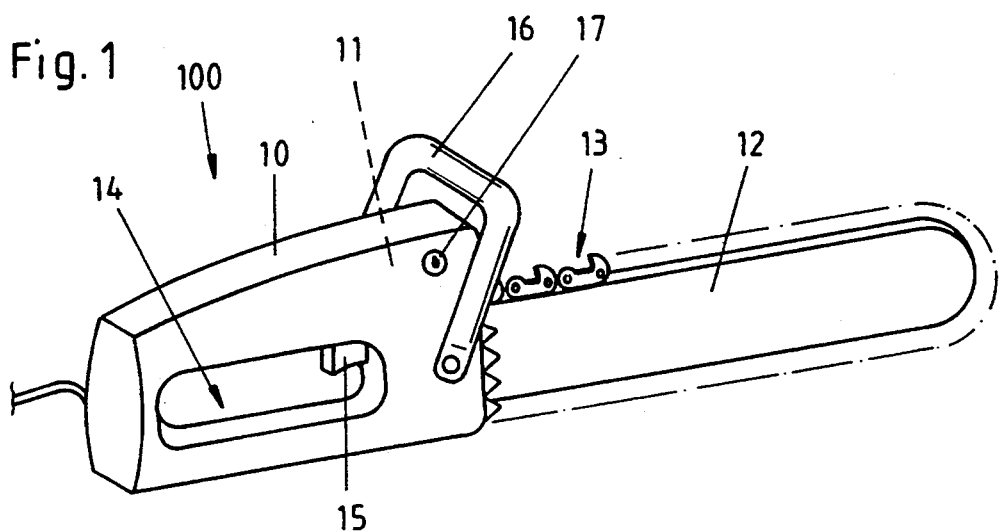
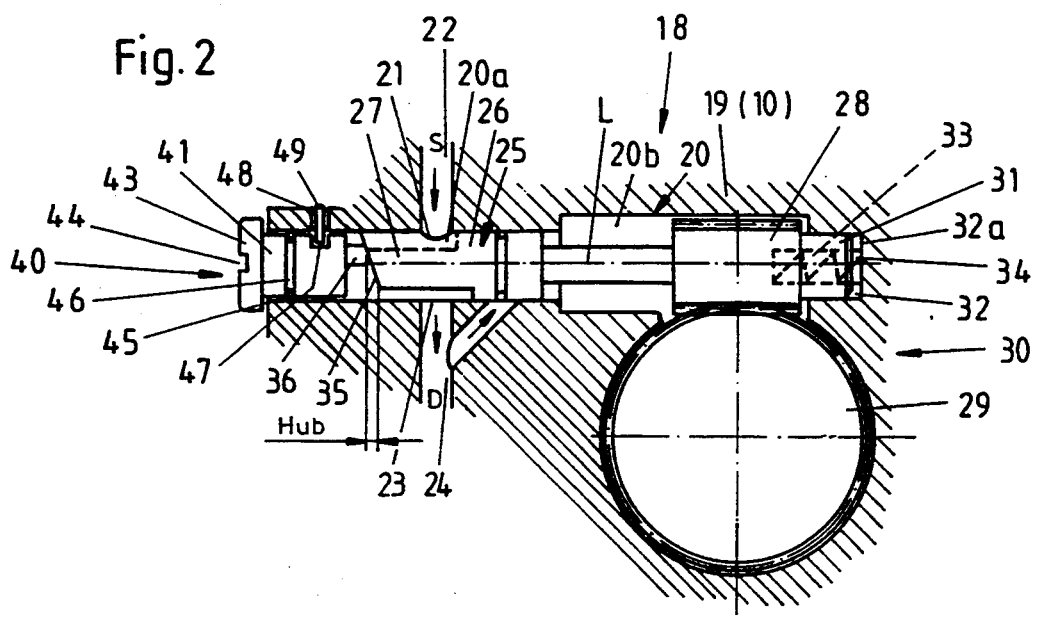

Volume regulation by phase shift

OIL PUMP, MORE PARTICULARLY FOR A CHAIN SAW

The present invention relates to an oil pump, more particularly for a chain saw. The pump has a cylindrical pump chamber constructed in a pump that has an intake slot and an outlet slot. A slidable pump piston located inside the pump chamber is also rotatable by means of a gearing. The pump piston has a sloping surface area that wobbles when the pump piston rotates. The surface area is springably supported against a stop which is disposed at a fixed distance in the direction of a central longitudinal axis of the pump piston. The distance between the central longitudinal axes of the stop and the piston predetermines the pump stroke. The reciprocating movement of the pump piston achieved upon rotation of the piston produces the pumping effect. Adjustment of flow volume is achieved by rotatably adjusting the stop, which changes the phase so that the time at which the inlet and outlet slots are open overlap to a greater or lesser extent.

BACKGROUND OF THE INVENTION

Plunger piston pumps for chainsaws of the basic type described above are known. A plunger piston oil pump is described in German patent document DE-OS 35 27 024. This oil pump comprises a cylindrical pump chamber provided with an intake slot and an outlet slot and a rotatable pump piston plunging into said pump chamber. The pump piston's rotational movement is superposed with a reciprocating movement, whereby the pumping effect is achieved. In this known oil pump it is possible to achieve a dosing of its delivery volume as follows. The surface of the pump piston has an inclined surface that wobbles when the pump piston is rotated, causing the piston to move back and forth in the chamber. The piston can be supported by a stop that is placed at an adjustable distance along the longitudinal axis of the chamber. The supporting means rests transversally to the longitudinal axis of the pump chamber, and is adjustable so as to be axially rigid and radial relative to the pump piston. The adjustable supporting means serves as a means for setting the delivery volume of the piston pump.

A somewhat different type of oil pump is described in German patent document DE-PS 29 45 246. This pump for portable guide rail chain saws has a pump piston mounted in a pump cylinder. The piston executes stroke motions with the aid of a driving means. The pump has an annular groove at its end opposite the driving means, which, via an outlet aperture disposed in the cylindrical wall of a duct, communicates with the pressure duct of the oil pump. An advantage of this oil pump is that pump operation is not interrupted by air being drawn off via the piston shank during the intake phase. Also, the driving unit of the oil pump is supplied with lubricant.

Practically all fields that employ lubricating oil pumps are faced with increasing environmental concerns. Therefore, it is desirable to regulate the delivery volume in order to deliver only the volume of oil necessary in all operating stages.

Previously known pumps regulate the volume of oil delivery by effecting a change in the pump piston stroke. Several examples of this type of volume regulation are known. In one pump, the stop is connected to a set screw that can be turned in a thread which is integral with the casing. By turning the set screw, the stroke of the pump piston is changed. However, in an arrangement of this kind it is difficult to accurately define the minimal and the maximal delivery volumes. Because of the threaded connection between the setting member and the casing, either no defined positions result, or else it is difficult to define positions. Moreover, operating errors are easily possible since, when turning this set screw in the inward or outward direction without having regard to predetermined or preset positions, it is possible to reduce the oil volume inadequately or to increase it excessively.

Another previously described means for adjusting the piston stroke involves a mechanical adjusting mechanism in which the position of the stop is adjusted in its radial distance relative to the central longitudinal axis of the pump piston. This solution does result in a great operational safety. However, the construction of such a device is relatively complicated and, on account of the number of components used, it is not economically optimal.

Another disadvantage of previously described adjusting means arises when one wants to adapt one pump design to several uses. For example, one must design the adjusting mechanism so that it is relatively large in its adjustment range if one wants to use one type of oil pump for several different types of chain saws. The oil requirement in a small chain saw provided for hobby purposes is, of course, quite different from the requirement in a very large chain saw intended for professional application. The present invention solves these and other problems inherent in previously known pumps.

SUMMARY OF THE INVENTION

The present invention is a reciprocating/rotating pump that has an means for very accurately adjusting the maximum and minimum oil delivery flow volume. The flow adjustment means is small, simple in its construction, and uses only a few components. The adjustment means is easily adaptable to different chain saw types. Also, the range of adjustment can be limited to prevent excessive or inadequate flow, so a continuous lubrication of the pump gear tooth driving means or bearing is ensured.

The oil flow volume is regulated by shifting the intake and pressure phases, while maintaining a fixed piston stroke. This is done by means of an eccentrically mounted cam (stop), which runs against a sloping terminal surface on the pump piston. The stop is constructed on a rotating element mounted in the pump casing so as to be rotatable about the central longitudinal axis of the pump piston. The stop is not displaceable axially. The rotating element comprises a shank and a rotating portion that is disposed on the outside of the casing. The rotating portion, which may be provided with an engagement slot for a screwdriver or be constructed in the form of a handle having a milled edge, can then be operated from the outside as a setting handle for the oil pump in an extremely easy manner.

According to a preferred embodiment, the rotating element is adjustable through an angle of rotation from 0° to 90°. Thus, the volume of oil delivered ranges from a maximum amount to a minimum delivery volume of zero. The entire range of regulation is realizable by means of a relatively minor adjustment. It is also very simple to apply markings to the casing to indicate the minimal and the maximal adjustment of the rotating element.

In another embodiment, the range of the rotational element's rotational movement is limited to a range smaller than 0° through 90°. For example, one may provide that the delivery volume cannot be set to less than a minimally acceptable volume by preventing the rotating element from being rotated to a position where the flow volume is zero. Operating error is thus made impossible, as residual lubrication is ensured at all times. One can achieve this limitation in the range of rotational adjustment by employing a rotating element that has a recess in its shank. The recess is engaged by a locking pin that is mounted integrally with the casing.

Another advantageous embodiment provides that the rotating elements are replaceable with rotating elements having a stop parts located at different distances from the longitudinal axis of the shank. By means of different rotating elements having stops of modified eccentricity, the minimal and the maximal oil volume can be accurately adapted to each individual chain saw size or length of guide rail. Consequently, operating errors are ruled out.

Additional advantageous constructions of the invention are characterized in the claims.

BRIEF DESCRIPTION OF THE DRAWINGS

FIG. 1 shows a diagrammatical view of a chain saw.

FIG. 2 shows a vertical section through the casing of the oil pump of the chain saw according to FIG. 1.

DETAILED DESCRIPTION OF THE PREFERRED EMBODIMENT

Figure 3:
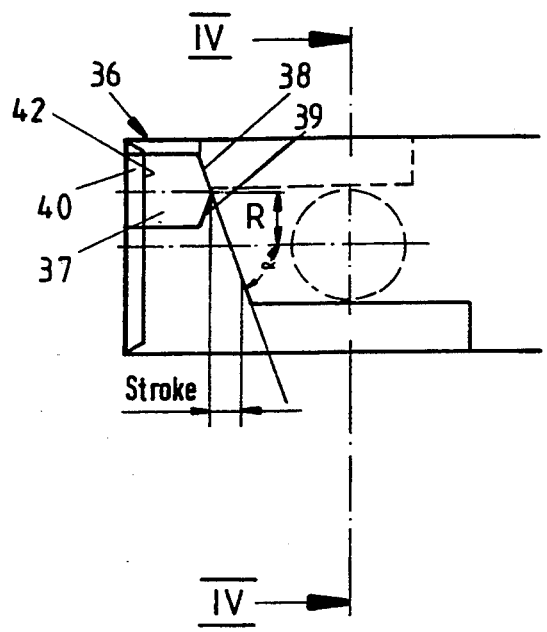
FIG. 3 shows an enlarged partial view of the oil pump in a schematic representation.

FIG. 1 shows a chain saw 100 that has a casing 10 of any construction whatever. Mounted within the casing is a driving means 11 (not shown in the drawing) for the saw chain 13 which rotates about a saw blade 12. The driving means may be an electrical motor, but can also be an internal combustion engine or some other suitable driving means.

On the casing, an integrated handle 14 is constructed, within whose area an actuating lever 15 for the driving means 11 is disposed. An angular handle 16 is also provided on the casing 10. In addition, on a suitable point of the casing 10, an adjustment handle 17 is provided for an oil pump 18 depicted in FIG. 2.

As is illustrated in FIG. 2, the oil pump 18 has a pump chamber 20 disposed in a pump housing 19. The pump housing 19 may be the casing 10 of the chain saw 100 (FIG. 1). The pump chamber 20 is comprised essentially of the pump chamber portion 20a, in which the oil delivery substantially takes place and the pump chamber portion 20b, in which the pump driving unit is mounted. The cylindrical pump chamber portion 20a is provided with an intake slot 21 of an intake port 22 on the intake side S. The pump chamber portion 20a also has an outlet slot 23, located opposite said intake slot 21, of a pressure duct 24 on the pressure side D. A pump piston 25 is slidably and rotatably positioned in this pump chamber section 20a. On its part which is movable within the pump chamber section 20a, the pump piston 25 possesses a cylindrical guiding section 26 which, in its contour, corresponds to the cross-section of the pump chamber section 20a. Disposed on the cylindrical guiding section is a pump piston section 27 that has a smaller diameter than the pump chamber. During the axial movement of the piston 25, the pump section 27 is located within the area of the intake slot 21 and the outlet slot 23.

On the portion of the pump piston 25 which is located in the pump chamber section 20b, a gear wheel 28 is attached which meshes with a drive wheel 29. The gear wheel 28 and the drive wheel 29 constitute the drive gear 30. The driving side end of the pump piston 25 is provided with a cylindrical guiding section 31 which is inserted into a corresponding cylindrical casing bore 32. During an axial movement of the piston, the guiding section 31 is displaced in the casing bore in a reciprocating manner. The guiding section 31 of the pump piston 25 is provided with a blind-end bore 33 that proceeds in the axial longitudinal direction L of the pump piston 25. A spring 34 is inserted into the bore, supported on the bottom 32a of the bore 32. Because of its pretension, the spring exerts a compressive force upon the pump piston 25 in the direction of the pump chamber portion 20a.

On its end located within the pump chamber section 20a, the pump piston 25 has a sloping terminal surface 35. The sloping terminal surface has, with respect to the central longitudinal axis L of the pump piston, 25, an angle alpha (as shown in FIG. 3). The sloping surface is supported against a supporting or stop part 36 due to the force of the spring 34.

The stop 36 comprises an approximately pin-shaped body 37 that has two oppositely located and contiguous inclined surface areas 38,39. The inclined surface area 38 rests against the terminal surface 35 of the pump piston 25. The stop 36 is eccentrically disposed on a rotating element 40 at a distance R from the central longitudinal axis L of the pump piston (FIG. 3). The rotating element, which is located within the housing 19, can be rotated about the central longitudinal axis L of the pump piston 25.

The rotating element 40 is comprised of a bolt-like shank 41 which has the stop part 36 formed on the radial terminal surface 42 of one of its ends. On its other end, the shank 41 has a disk-shaped rotating portion 43. The rotating portion, which is shaped somewhat like a screw head, is provided with an engagement slot 44 for a tool such as a screwdriver (not shown in the drawing). The rotating element 40 closes the pump chamber section 20a against the outside, for which purpose a seating ring 45 is disposed on the rotating element 40.

In one embodiment, the shank 41 of the rotating element 40 is provided with a recess 47 that extends axially according to the width of a locking pin 49 which can be inserted into the recess 47 by being pushed through a bore 48 in the pump casing. The recess extends radially through an angle of, for example, 75° about the central longitudinal axis L of the shank 41 so that the rotatability of the rotating element 40 is, by way of example, restricted to 75°. With this, the rotation of the stop part 36 through the angle beta (FIG. 4) is likewise restricted to 75°.

Figure 4:
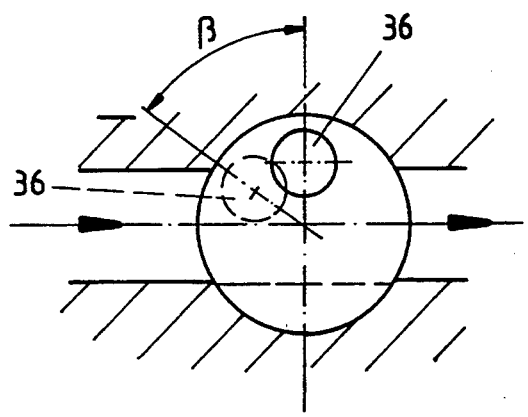
FIG. 4 shows a sectional representation in the direction of line IV—IV in FIG. 3.
Figure 5:
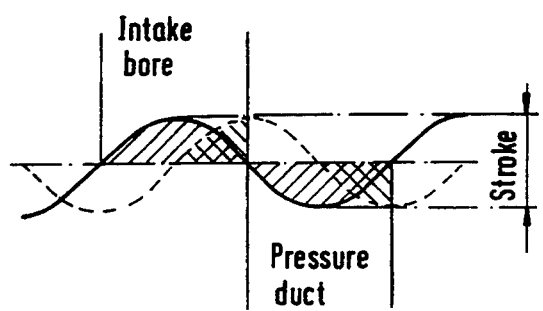
FIG. 5 shows a schematic representation of the novel phase shift by which the pump achieves flow volume regulation.

The function of the novel pump regulation is explained in greater detail below with the aid of FIGS. 3 through 5.

As stated above, a stop 36 in the form of an eccentric cam is mounted on the rotating element 40. The stop 36 is comprised of a pin-like body 37, on whose end two inclined surfaces 38,39 are constructed. The angles of the surfaces 38,39 correspond to the angle alpha, which is between the inclined surface 38 and the central longitudinal axis L of the pump piston 25.

The terminal surface 35 of the pump piston 25 executes a wobbling motion when the pump piston rotates, causing the pump piston to move in a reciprocating manner because of the spring 34. Thus, in addition to the rotation, an axial movement is superimposed. As a result, the space available in the pump chamber 20a is alternately reduced and increased and the pumping effect is achieved. As can be seen from the Figures, the guiding section 26 sweeps the intake slot 21 and the outlet slot 23 at different times as the piston reciprocates as a result of its rotation. The timing of the intake bore and pressure bore openings are depicted in FIG. 5.

When the angular position of the stop 36 about the central longitudinal axis of the rotating element 40 is changed by rotating the rotating element through an angle beta (FIG. 4), a phase shift occurs. The cylindrical guiding section 26 then intermittently overlaps The opening of the inlet and outlet apertures intermittently overlap, so that the reduced pumping effect is achieved. The curve shown as a broken line in FIG. 5 thus results, with delivery still taking place only within the overlap areas. When the angle beta reaches its maximum of 90°, the pump tends to a zero delivery volume. The phase shift can be continuously effected and thus always results in the desired volume of oil being delivered.

In a further refinement, one can insert into the pump a different rotating element for which the distance R between the central longitudinal axis of the stop 36 and the central longitudinal axis of the pump piston 25 is altered. This results in a change in stroke that is entirety independent of the phase shift achievable by the rotation through the angle beta. The maximally deliverable volume of oil is increased or decreased. However, the volume regulation due to the phase shift remains proportionally the same.

What is claimed is:

1. An oil pump (18) which comprises:
   (a) a cylindrical pump chamber (20) constructed in a pump casing (19), the pump chamber having an intake slot (21) and an outlet slot (23);
   (b) a pump piston (25) slidably and rotatably located in the pump chamber (20), wherein the piston is rotatable by means of a gearing (30); and
   (c) a sloping surface area (35) on the pump piston (25), said surface area (35) being springably supported against a stop (36) which is disposed in the direction of a central longitudinal axis (L) of the pump piston (25) at a fixed distance (R) from the central longitudinal axis, wherein the fixed distance (R) predetermines the pump stroke;
   wherein the sloping surface area (35) wobbles when the pump piston (25) rotates, producing an axial reciprocating movement of the pump piston (25) that produces the pumping effect; and
   wherein the angular position of the stop (36) about the central longitudinal axis (L) of the pump piston is adjustable about an axis of rotation whereby a change in the angular position of the stop causes a greater or lesser flow volume by decreasing or increasing, respectively, the amount of time during each stroke of the pump piston in which both the inlet slot and the outlet slot are open simultaneously.

2. An oil pump according to claim 1 wherein the stop (36) is adjustable through an angle of rotation of from 0° to 90° and, thereby, the oil delivery volume is adjustable from a delivery maximum to a zero delivery volume minimum.

3. An oil pump according to 1 wherein the rotational movement of the stop (36) is limited to an angle of rotation of from 0° to less than 90° so that an acceptable minimum delivery volume is permanently preset.

4. An oil pump according to claim 1 wherein the stop (36) is constructed on a rotating element (40) which is mounted within the pump housing (19), wherein the rotating element is rotatable about the central longitudinal axis (L) of the pump piston (25) and is axially indisplaceable.

5. An oil pump according to claim 4 wherein the rotating element (40) is comprised of a shank (41) provided with a recess (47), into which a housing-integral locking pin (49) engages, and a rotating portion (43) disposed on the outside of the housing.

6. An oil pump according to claim 5 wherein the recess extends axially over a length which corresponds to the diameter of the locking pin (49) and radially across an angle which is smaller than or equal to 90° about the central longitudinal axis (L) of the shank (41).

7. An oil pump according to claim 5 wherein a central longitudinal axis of the stop (36) and the central longitudinal axis (L) of the pump piston (25) are parallel and are separated by a distance (R) which predetermines the pump stroke.

8. An oil pump according to claim 4 wherein said rotating element (40) is removably mounted within the pump housing, wherein the maximum delivery volume is increased or decreased by removing said rotating element and mounting within the pump housing a second rotating element having a stop part (36) located at a different distance (R) from a central longitudinal axis (L) of the shank (41) compared to the distance (R) for the first rotating element.

* * * * *